(12) United States Patent
Redmann et al.

(10) Patent No.: US 8,485,665 B2
(45) Date of Patent: Jul. 16, 2013

(54) METHOD AND SYSTEM FOR THREE-DIMENSIONAL (3D) PROJECTION

(75) Inventors: William Gibbens Redmann, Glendale, CA (US); Mark J. Huber, Burbank, CA (US)

(73) Assignee: Thomson Licensing, Issy les Moulineaux (FR)

( * ) Notice: Subject to any disclaimer, the term of this patent is extended or adjusted under 35 U.S.C. 154(b) by 187 days.

(21) Appl. No.: 12/807,648

(22) Filed: Sep. 10, 2010

(65) Prior Publication Data

US 2011/0063576 A1    Mar. 17, 2011

Related U.S. Application Data

(60) Provisional application No. 61/241,842, filed on Sep. 11, 2009.

(51) Int. Cl.
 *G03B 21/00* (2006.01)
(52) U.S. Cl.
 USPC ........ 353/8; 353/20; 353/31; 353/34; 353/38; 353/99; 359/462; 349/9
(58) Field of Classification Search
 USPC ........ 353/20, 31, 34, 37, 38, 98, 99, 8; 349/7, 349/8, 9, 5, 113, 115; 359/462–469; 348/42, 348/51, 56, 57, 58
 See application file for complete search history.

(56) References Cited

U.S. PATENT DOCUMENTS

| | | | |
|---|---|---|---|
| 3,507,549 A | 4/1970 | Land | |
| 4,372,656 A | 2/1983 | Marks et al. | |
| 4,464,028 A | 8/1984 | Condon | |
| 4,884,876 A * | 12/1989 | Lipton et al. | 349/33 |
| 5,125,733 A * | 6/1992 | Lee | 353/7 |
| 5,481,321 A | 1/1996 | Lipton | |
| 5,575,548 A * | 11/1996 | Lee | 353/31 |
| 6,034,818 A | 3/2000 | Sedlmayr | |
| 6,042,237 A * | 3/2000 | De Vaan et al. | 353/38 |
| 6,122,103 A | 9/2000 | Perkins et al. | |
| 6,486,997 B1 * | 11/2002 | Bruzzone et al. | 359/247 |
| 7,357,510 B2 * | 4/2008 | Kim et al. | 353/7 |
| 7,714,945 B2 * | 5/2010 | Tan et al. | 349/8 |

(Continued)

FOREIGN PATENT DOCUMENTS

| | | |
|---|---|---|
| WO | WO2005109091 | 11/2005 |
| WO | 2006036744 | 4/2006 |
| WO | 2008048494 | 4/2008 |

OTHER PUBLICATIONS

Condon et al., Principles of Quality 3D motion picture projection. Stereovision International, Inc. 1983. http://www.film-tech.com/warehouse/wareview.php?id=817&category=2.

Instructions for Use of "Above/Below" Type Stereo Vision 3D Lens Projection System, Sterovision International, Inc. 1981. http://www.film-tech.com/warehouse/wareview.php?id=816&category=2.

(Continued)

*Primary Examiner* — Georgia Y Epps
*Assistant Examiner* — Sultan Chowdhury
(74) *Attorney, Agent, or Firm* — Robert D. Shedd; Wan Yee Cheung

(57) ABSTRACT

A method and system are described for projecting stereoscopic images using circularly polarized light with at least one polarizer for limiting the amount of light or radiant energy reaching a projection lens system and associated optical elements, and system configurations are discussed with respect to desired performance characteristics.

26 Claims, 3 Drawing Sheets

U.S. PATENT DOCUMENTS

| | | | |
|---|---|---|---|
| 8,157,381 B2* | 4/2012 | DeCusatis et al. | 353/7 |
| 2005/0078369 A1* | 4/2005 | Blanchard | 359/462 |
| 2006/0114415 A1* | 6/2006 | Shestak et al. | 353/7 |
| 2006/0291053 A1* | 12/2006 | Robinson et al. | 359/465 |
| 2007/0002279 A1 | 1/2007 | Berman | |
| 2007/0035830 A1* | 2/2007 | Matveev et al. | 359/464 |
| 2008/0143965 A1* | 6/2008 | Cowan et al. | 353/8 |
| 2009/0128780 A1* | 5/2009 | Schuck et al. | 353/20 |
| 2010/0060857 A1* | 3/2010 | Richards et al. | 353/7 |

OTHER PUBLICATIONS

Paramount Pictures Corporation: 3-D Projection system instruction manual, c. 1985; http://www.film-tech.com/warehouse/wareview.php?id-804&category=2.

ISCO Optic: Instruction Manual for Stereovision-3d, From ISCO-OPTIC GmbH, Gottingen, Germany, c. 1995.

* cited by examiner

US 8,485,665 B2

METHOD AND SYSTEM FOR THREE-DIMENSIONAL (3D) PROJECTION

CROSS-REFERENCE TO RELATED APPLICATIONS

This application claims priority to U.S. Provisional Application Ser. No. 61/241,842, "Method and System for Three-Dimensional (3D) Projection" filed on Sep. 11, 2009, which is herein incorporated by reference in its entirety.

This application contains subject matter related to PCT Patent Application PCT/US09/006557, "Improved Over-Under Lens for Three Dimensional Projection" filed on Dec. 15, 2009, which is herein incorporated by reference in its entirety.

TECHNICAL FIELD

The present invention relates to a-system and method for projecting images for three-dimensional (3D) presentation.

BACKGROUND

The current wave of 3-dimensional (3D) films is gaining popularity and made possible by the ease of use of 3D digital cinema projection systems. However, the rate of rollout of digital systems is not adequate to keep up with demand, partly because of the relatively high cost involved. Although earlier 3D film systems suffered from various technical difficulties, including mis-configuration, low brightness, and discoloration of the picture, they were considerably less expensive than the digital cinema approach. In the 1980's, a wave of 3D films were shown in the US and elsewhere, making use of a lens and filters designed and patented by Chris Condon (U.S. Pat. No. 4,464,028). Other improvements to Condon were proposed, such as by Lipton in U.S. Pat. No. 5,841,321. Subject matter in both references are herein incorporated by reference in their entireties.

One lens configuration uses a dual-lens arrangement (e.g., an upper lens for projecting images for one eye, and a lower lens for projecting images for the other eye) to simultaneously project left- and right-eye images of a stereoscopic image pairs laid out above and below each other on a same strip of film. The left- and right-eye images are encoded by passing each image through respective lens assemblies with separate filters (e.g., including polarizers or color filters). The filter in each lens assembly encodes a respective right- or left-eye image so that a viewer or audience wearing glasses having corresponding left- and right-eye decoding filters (can also be referred to as viewing filters) will only see projected left-eye images through the left-eye viewing filter, and projected right-eye images through the right-eye viewing filter.

However, the polarizers and other elements (including lenses) in these prior film-based 3D systems often suffer from overheating and failure when exposed to high radiant flux from the illumination source typically used in these systems. As a result, such projection systems must be operated at a reduced brightness, and/or with frequent replacement of one or more of the polarizers and other elements. Although some systems incorporate infrared- or ultraviolet-blocking filters in front of the projection lens or polarizers to reduce overheating, such measures are not able to completely eliminate the problem.

SUMMARY OF THE INVENTION

One aspect of the invention provides a system for three-dimensional (3D) projection of right-eye images and left-eye images. The system includes a first linear polarizer before at least a first lens element for transmitting the right-eye images, the first linear polarizer having a first polarization axis direction, a second linear polarizer before at least a second lens element for transmitting the left-eye images, the second linear polarizer having a second polarization axis direction. The first and second linear polarizers are configured for limiting luminant flux reaching at least the first and second lens elements.

Another aspect of the invention provides a method for three-dimensional (3D) projection of right-eye and left-eye images, which includes: transmitting the right-eye images through a first linear polarizer and at least a first lens element positioned after the first linear polarizer, transmitting the left-eye images through a second linear polarizer and at least a second lens positioned after the second linear polarizer. The first and second linear polarizers are configured for transmitting light characterized by respective first and second polarization axis directions, and for limiting luminant flux reaching the first and second lens elements.

BRIEF DESCRIPTIONS OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures. The drawings are not to scale, and one or more features may be expanded or reduced for clarity.

DETAILED DESCRIPTION OF THE DRAWINGS

One aspect of the present invention provides an improved single-projector dual-lens three-dimensional (3D) film projection system, which includes one or more reflective polarizers positioned between a 3D film and a projection lens system to protect heat-sensitive optical elements (e.g., lenses, linear polarizers, birefringent quarter wave retarders, and so on) from being exposed to high radiant flux from an illumination source. By reducing the radiant energy entering the lens system, overheating of the optical elements is reduced, thus allowing the system to operate at higher brightness or illumination with fewer component failures.

Embodiments of the present invention can be applied to a single, standard, two dimensional (2D) film projector outfitted with a dual (e.g., stereoscopic) lens system to project each of two images of a stereoscopic pair at the same time, one for the left eye, one for the right eye. A filter inline with each of the left- and right-eye halves of the dual lens is used for encoding the corresponding left- and right-eye images so that when the images are projected on a screen, an audience member wearing glasses with filters having proper orientations with respect to those of the dual lens and polarizer system, will perceive left-eye images in the left eye, and right-eye images in the right eye. As used in the descriptions of the present invention herein, "filter" means a polarizer, whether linear or circular, with a circular polarizer comprising a linear polarizer and a quarter-wave retarder. One or more aspects of the present invention can also be applied to certain special-venue 3D projection systems in which two synchronized projectors are used for projecting the respective left- and right-eye images, or to certain digital cinema projectors, e.g., by providing reflective polarizers immediately prior to a projection lens.

Figure 1:
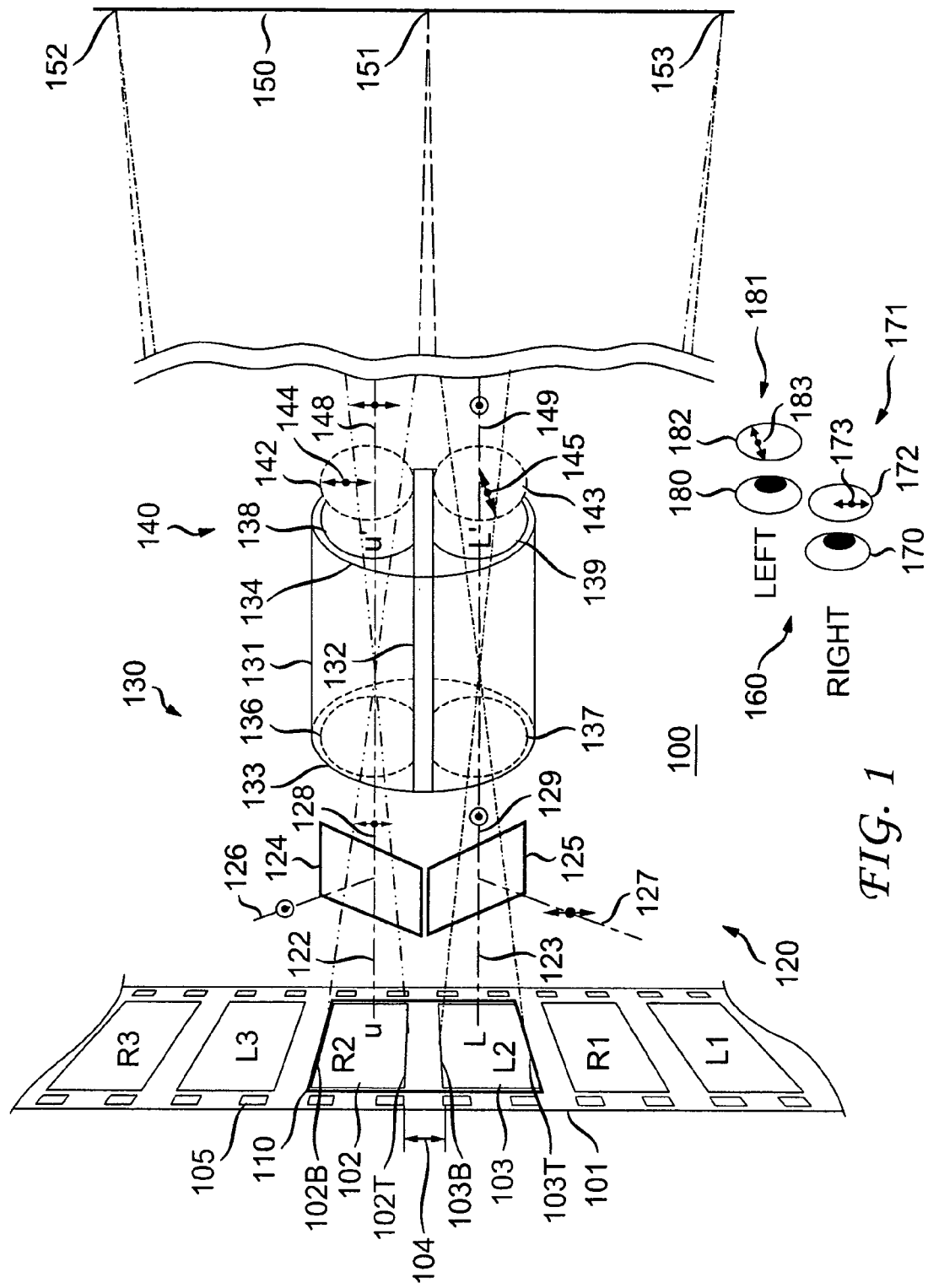
FIG. 1 shows a stereoscopic film projection system using a dual lens and polarizer assembly according to one embodiment of the present invention.

FIG. 1 shows one embodiment of a 3D film projection system 100 of the present invention, suitable for projecting stereoscopic images from a motion picture film 101, e.g., a 35 mm projection print film, only a segment of which is shown. The 3D film 101 includes stereoscopic image pairs, such as R1 and L1, R2 and L2 (also labeled as right-eye image 102 and left-eye image 103), and R3 and L3, each pair corresponding to a right-eye image and a left-eye image of a scene. Right-eye and left-eye images are arranged alternately along the film in an over/under configuration, in which the right-eye and left-eye images of a stereoscopic pair are arranged one above the other within a frame. As shown in FIG. 1, the stereoscopic image pair 102 and 103 is centered in a film gate and framed by aperture plate 110 for projection. Due to the inverting nature of the projection system, the film 101 is provided with the images inverted within a frame, e.g., the bottoms 102B and 103B of images 102 and 103 provided above the tops 102T and 103T of the images. Rows of sprocket holes 105 are provided along each edge of film 101 for advancing the film, and an optical soundtrack (not shown), which may be in digital format, is typically provided on the film.

Right-eye and left-eye images R2 and L2 are simultaneously illuminated by a light source and condenser optics (not shown, collectively called the "illuminator") located behind the film, i.e., on the other side of the film away from the dual-lens system 130, such that images R2 and L2 are projected onto screen 150.

The projection system 100 includes a dual-lens system 130 and one or more polarizers or filters. The dual-lens system 130 has a lens body 131, an entrance end 133 and an exit end 134. The lens system 130 has upper and lower halves (may be referred to as two lens assemblies) separated by septum 132, which prevents stray light from crossing between the two lens assemblies. The upper lens assembly, typically used for projecting right-eye images such as image R2, has entrance lens element 136 and exit lens element 138. The lower lens assembly, typically used for projecting left-eye images such as image L2, has entrance lens element 137 and exit lens element 139. Other lens elements and aperture stops internal to each half of dual lens system 130 are not shown, for clarity's sake. For example, additional lens elements, e.g., a magnifier following the exit end of dual lens system 130, may be added when appropriate to the proper adjustment of the system. Projection screen 150 has a center point 151 at which the projected right- and left-eye images of the film should be centered.

Right- and left-eye images R2 (102) and L2 (103) are separated on the film by a gap 104 (also known as "intra-frame gap"), which facilitates subsequent masking of stray light when light from one image enters the wrong half of lens system 130.

With a properly aligned projection system, right-eye image 102 and left-eye image 103 are projected onto screen 150 so that the projected images are substantially superimposed, i.e., the center of each projected image is located substantially at the center 151 of the screen, with the tops 102T and 103T of the respective images projected at or near the top 152 of the screen, and the bottoms 102B and 103B projected at or near the bottom 153 of the screen.

The projection system 100 also includes a polarizer assembly 140 positioned after the lens system 130 (i.e., at the output end 134), with a top linear polarizer 142 aligned with the top half of lens system 130 along an optical axis UU', and a bottom linear polarizer 143 aligned with the bottom half of lens system 130 along an optical axis LL'. A polarization axis 144 of the linear polarizer 142 determines or defines the polarization characteristics of the projected right-eye images (e.g., whether the light used to project the right-eye images is vertical or horizontally polarized), and a polarization axis 145 of the linear polarizer 143 defines the polarization characteristics of the projected left-eye images. When linear polarizers are used for encoding the respective right- and left-eye images, the projected left-eye images have a polarization direction that is orthogonal to that of the projected right-eye images. As shown in FIG. 1, polarizer 142 provides vertical polarization for the projected right-eye images, and polarizer 143 provides horizontal polarization for the projected left-eye images. In another example, right-eye images can be projected with horizontally polarized light and left-eye images can be projected with vertically polarized light.

Projection screen 150 is a polarization-preserving screen, e.g., a silver screen whose metalized surface scatters light but substantially retains (though reflected) its polarization. Thus, the respective polarizations imposed on the projected right- and left-eye images by polarizers 142 and 143 remain unchanged after reflection off screen 150.

To properly view the projected stereoscopic images, audience member 160 is provided with 3D glasses having linear polarizers with orientations that correspond to those in polarizer assembly 140. Thus, a right-eye portion 171 of the 3D glasses includes linear polarizer 172 with polarization axis 173 that has the same orientation as polarizer 142, and a left-eye portion 181 of the 3D glasses includes linear polarizer 182 with polarization axis 183 that has the same orientation as polarizer 143.

In the embodiment of FIG. 1, a polarizer assembly 120, which includes a linear polarizer 124 and a linear polarizer 125, is provided before entrance lenses 136 and 137. Since these polarizers are located before the lens system 130, and in some embodiments, represent the first of several polarizers encountered by the illumination light in the projection system, they may also be referred to as "pre-polarizers". In this example, polarizers 124 and 125 are both reflective polarizers, which means that when light is incident on linear polarizer 124 or 125, one polarization component is transmitted in accordance with the orientation of the polarizer, while the other polarization component (with an orientation orthogonal to that of the transmitted component) is reflected. Assembly 120 further comprises a holder or bracket (not shown) to hold polarizers 124 and 125 in place near the entrance end 133 of lens system 130 and aligned with respect to the upper and lower halves of the lens system. In this embodiment, polarizer 124 is configured to transmit a polarization component that is the same as that transmitted by polarizer 142, and polarizer 125 is configured to transmit a polarization component that is the same as that transmitted by polarizer 143.

In one example, polarizers 124 and 125 are wire grid polarizers such as those manufactured by MOXTECH, Inc. of Orem, Utah. Details of these wire grid polarizers are described in Perkins et al. in U.S. Pat. No. 6,122,103, which is herein incorporated by reference in its entirety.

Light from an illumination source is focused by an illuminator (not shown) with an f-number of approximately f/2, and passes through film 101 while substantially filling the opening in aperture plate 110 and converging toward entrance end 133. In a well-aligned projector, the light converges to a region interior to lens system 130, namely, the aperture stop.

As shown in FIG. 1, light beam or component 122 represents a centerline of bundles of light rays, such as those passing through right-eye image 102 on film 101. When light beam 122 is incident on polarizer 124, a portion of the beam 122 is rejected, i.e., reflected off as light beam 126. In this case, polarizer 124 is configured to transmit vertically polarized light, while reflecting most of the horizontally polarized component in light beam 122. In this configuration, about one half of the radiant energy or, similarly, one half of the luminant flux of the incident light is reflected off. The remaining portion of light beam 122 passing through polarizer 124 is mostly vertically polarized light 128, which enters the lens system 130 through entrance lens element 136. Light beam 128 exiting from lens element 138 may have a small fraction of horizontally polarized component, e.g., due to a slight rotation of the polarization as a result of the nature of geometric optics, and/or polarization leakage from the polarizer 124.

Since polarizer 142 is configured to pass vertically polarized light, it acts as a cleanup polarizer, resulting in light beam 148 being substantially (e.g., almost 100%) vertically polarized for forming the projected right-eye image on screen 150. In another embodiment, linear polarizer 142 may be omitted from FIG. 1, e.g., if the amount of horizontal polarization component in light beam 128 is insignificant, or considered acceptable from a performance viewpoint.

In the case of left-eye image projection, light beam 123 illuminating the left-eye image 103 is incident on polarizer 125, which reflects off the vertical polarization component as light beam 127, thus rejecting about half of the radiant energy of light beam 123. The remaining portion of incident light 123 passes through polarizer 125 as mostly horizontally polarized light 129, which enters the lens system 130 through entrance lens element 137. Light beam 129 exiting from lens element 139 may also have a small fraction of vertically polarized component. Since polarizer 143 is configured to pass horizontally polarized light, it acts as a cleanup polarizer, resulting in light beam 149 being substantially (e.g., almost 100%) horizontally polarized for forming projected left-eye image on screen 150. Again, if desired, polarizer 143 may be omitted, e.g., if the amount of vertical polarization component in light beam 129 is insignificant, or considered acceptable from a performance viewpoint.

Thus, polarizer assemblies 120 and, optionally, 140 ensure that the light component for projecting the right-eye image 102 is vertically polarized, and is therefore viewable only through the right-eye filter 172 of the 3D glasses, while the left-eye image 103 is projected with horizontally polarized light, and is therefore viewable only through the left-eye filter 182 of the 3D glasses.

The effect of polarizers 124 and 125 is to reject a portion of the radiant energy, or luminant flux, e.g., about one half of the incident energy, passing from film 101 toward lens system 130, which also results in a reduction of a significant portion of the radiant energy that would otherwise be absorbed by polarizers 142 and 143. Not only does the use of polarizers 124 and 125 reduce the radiant energy absorbed by elements within lens system 130 by about one half (i.e., the presence of polarizer 124 and 125 reduces energy absorbed by the lens elements energy by a factor of 2 compared to when polarizers 124 and 125 are absent), but it also reduces the energy absorbed by the polarizers 142 and 143 by well more than one half, since polarizers 142 and 143 transmit most of the energy having an aligned polarization. In certain embodiments, the use of polarizers 124 and 125 may reduce the radiant energy absorbed by polarizers 142 and 143 by greater than 70%. Polarizers 142 and 143 would absorb most of the energy having a crossed polarization, but the polarizers 124 and 125 have already eliminated much of this. As a result, polarizers 142 and 143 run much cooler than in prior art systems, even as the brightness of the illuminator (not shown) increases.

The light beams 126 and 127 rejected by polarizers 124 and 125 may be allowed to scatter, or may be directed by polarizers 124 and 125 (e.g., by orienting the polarizers at appropriate angles) into beam dumps (not shown), which are surfaces or cavities from which very little of the light beams 126-127 would escape.

Polarizers 124 and 125 may be configured to lie in the same plane, and may even be fabricated from a single substrate. In these cases, rejected light beams 126 and 127 will be reflected in a common direction.

Polarizers 124 and 125 may even lie in a plane substantially normal to the axis of lens system 130, but in any case, care should be taken that the rejected light 126 and 127 (which could be directed back toward images 102 and 103 on film 101) do not produce flares on screen 150 by illuminating either some portion of film 101, some portion of the aperture plate 110, some other portion of the projection system, or some combination thereof, such that the stray light subsequently reaches screen 150 or is projected by lens system 130 onto screen 150.

In the embodiment of FIG. 1, crosstalk between right- and left-eye images can easily arise if the orientation of 3D glasses worn by audience member 160 does not remain substantially vertical, e.g., as with head movement such as tilting. This constraint can be relaxed by using circularly polarized light for projecting the stereoscopic images, which will be discussed with reference to FIGS. 2A and 2B.

In a circularly polarized stereoscopic display, the right- and left-eye images are projected with opposite circular polarizations, i.e., clockwise (CW, also called right-handed) and counter-clockwise (CCW, also called left-handed). The projected stereoscopic images are viewed by audience through a pair of 3D glasses with two circular polarizers serving as respective analyzers for the right- and left-eye images, i.e., one passing only CW polarized light and the other passing only CCW polarized light.

Circular polarizers are formed by combining a linear polarizer and a quarter-wave retarder. The quarter-wave retarder is made of a birefringent material (which may be provided in the form of a film, crystal, among others) having a fast axis and a slow axis such that the retarder appears, for a particular wavelength $\lambda$, to have a thickness producing an optical path length of $n\lambda$ for light having a polarization aligned with the fast axis (where n is a positive number, and $\lambda$ is the wavelength of incident light), but an optical path length of $(n+\frac{1}{4})\lambda$, for light having a polarization aligned with the slow axis, so that polarizations aligned with the slow axis appear to be $\lambda/4$ or 90° retarded relative to polarizations aligned with the fast axis.

When a linear polarizer and a quarter-wave retarder are paired or combined, a clockwise circular polarizer is formed by orienting the fast axis of the quarter-wave retarder to be 45° clockwise from the polarization axis of the linear polarizer, when the quarter-wave retarder is viewed through the linear polarizer (i.e., when the linear polarizer is between the viewer and the quarter-wave retarder). A counter-clockwise circular polarizer is formed by orienting the fast axis of the quarter-wave retarder to be 45° counter-clockwise from the polarization axis of the linear polarizer.

Figure 2A:
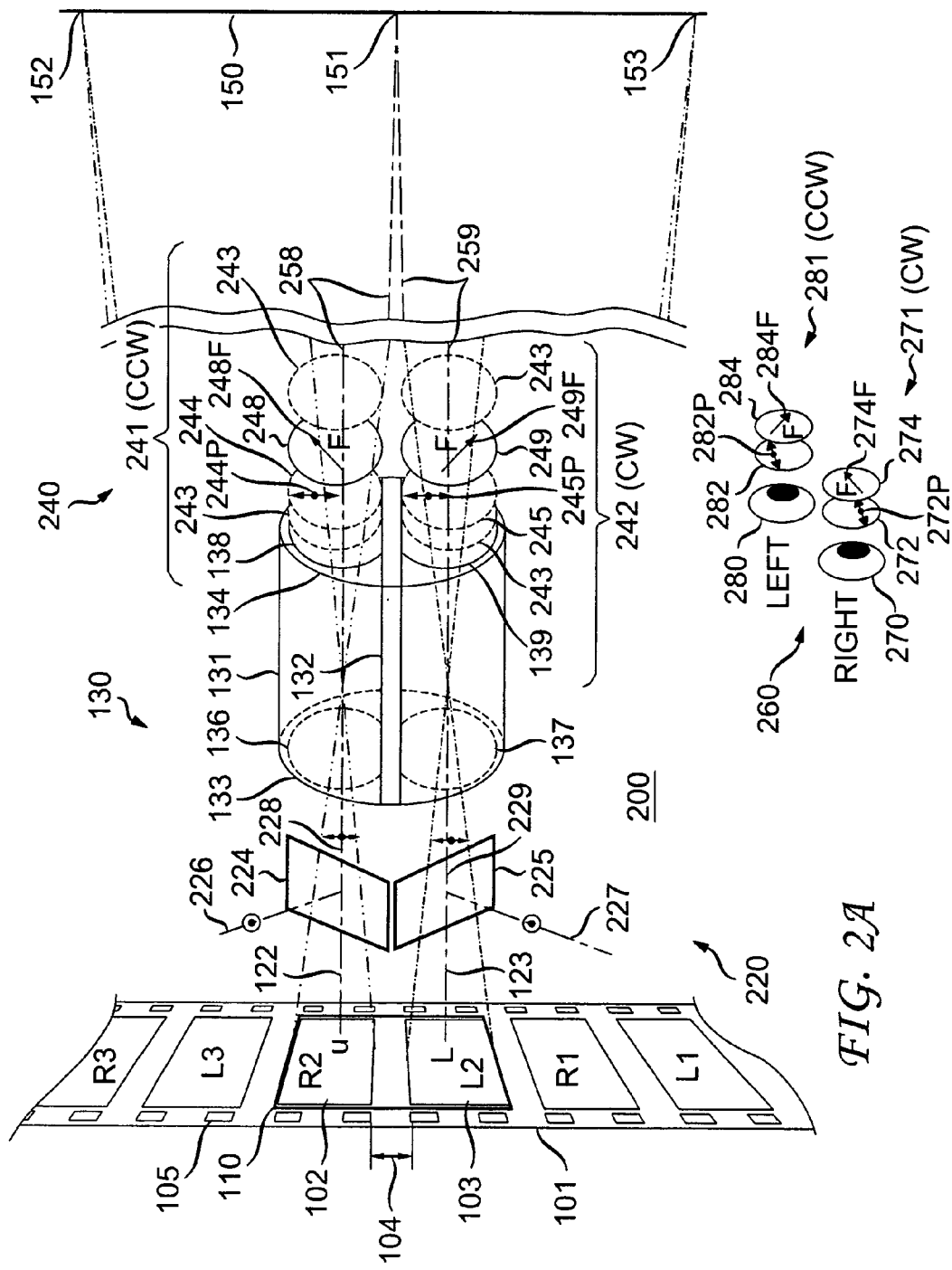
FIG. 2A shows a stereoscopic film projection system using a dual lens and polarizer assembly according to one embodiment of the present invention.

FIG. 2A shows one embodiment of the present invention, in which circularly polarized light is used in a projection system 200 for projecting stereoscopic images. The projection system 200 includes a linear polarizer assembly 220, a lens system 130 and a circular polarizer assembly 240.

The linear polarizer assembly 220 includes two linear polarizers, an upper polarizer 224 and a lower polarizer 225, positioned in front of entrance lenses 136 and 137, respectively, for limiting luminant flux or radiant energy reaching the lens system 130 and other optical elements such as those in the circular polarizer assembly 240. In one embodiment, the polarizers 224 and 225 are reflective polarizers. Similar to the polarizer assembly 120 in FIG. 1, linear polarizers 224 and 225 are configured to transmit a given polarization component of incident light, while rejecting the other polarization component that is orthogonal to the transmitted component. The functions and characteristics of polarizers 224 and 225 are substantially similar to those previously discussed for polarizers 124 and 125 in FIG. 1, and will not be repeated here. Polarizers 224 and 225 are oriented to transmit respective polarization components that are appropriate for use with the circular polarizer assembly 240, as discussed below.

The circular polarizer assembly 240, positioned after lens system 130, includes circular polarizer sub-assemblies 241 and 242. In this example, right-eye images are encoded by a counter-clockwise (CCW), or "left-handed" circular polarizer, formed by linear polarizer 244 and quarter-wave retarder 248. The polarization axis 244P of linear polarizer 244 is substantially parallel to the polarization axis of polarizer 224. The fast axis 248F of quarter-wave retarder 248 is oriented at 45° counterclockwise from the vertical polarization axis 244P (as viewed through or from polarizer 244) to produce counter-clockwise circularly polarized light 258 for projecting right-eye images.

Left-eye images are encoded by a clockwise (CW) or "right-handed" circular polarizer, formed by linear polarizer 245 and quarter-wave retarder 249. Linear polarizer 245 is oriented so that its polarization axis 245P is substantially parallel to the polarization axis of polarizer 225. The fast axis 249F of quarter-wave retarder 249 is oriented at 45° clockwise from the vertical polarization axis 245P (as viewed through or from polarizer 245) to produce clockwise circularly polarized light 259 for projecting left-eye images. Each circular polarizer or the linear polarizer and quarter-wave retarder combination, i.e., (244, 248) and (245, 249), can also be referred to as an encoding polarizing filter.

In some embodiments, right-eye circular polarizer sub-assembly 241 includes one or more transparent cover plates 243 to protect the linear polarizer 244 and/or quarter-wave retarder 248, and left-eye circular polarizer 242 includes one or more transparent cover plates 243 to protect the linear polarizer 245 and/or quarter-wave retarder 249. In the example of FIG. 2A, one cover plate 243 is positioned between the lens system 130 and linear polarizer 244 and another cover plate 243 is provided after quarter-wave retarder 248 for protecting the respective surfaces of the components of this encoding circular polarizer. Similarly, two cover plates 243 are provided for protecting the components 245 and 249 of the other encoding circular polarizer. The cover plates 243 are made of materials such as glass, and have optical properties that do not affect the transmission characteristics of the polarizing filters.

Holders or adhesives for mounting various components in the polarizer assembly 240 are not shown, but are within ordinary skill in the art. Care should be taken to ensure that orientations of the components are maintained and that adequate relief is provided for thermal expansion of the components. The components of right- and left-eye circular polarizer sub-assemblies 241, 242 may be laminated (e.g., with an optical adhesive) into a single stack of material, or may include one or more air-gaps. In particular, providing an air gap between either surface of polarizers 244, 245 and the surface of any adjacent elements can improve heat dissipation.

The transmission of stereoscopic images through the projection system 200 for 3D projection is similar to that described for FIG. 1, and is summarized as follows. Portions of incident illumination light 122 and 123 are transmitted by polarizers 224 and 225, respectively, as vertically polarized light, shown as light beams 228 and 229. The respective horizontal polarization components of incident light are reflected off as light beams 226 and 227, which may be allowed to scatter, or be directed into beam dumps (not shown). In one example, about half of the radiant energy of incident light 122 is rejected by polarizer 224, and about half of the radiant energy of incident light 123 is rejected by polarizer 225.

Similar to polarizers 124 and 125 in FIG. 1, the presence of polarizers 224 and 225 result in a significant reduction of radiant energy that would otherwise be absorbed by polarizers 244 and 245. This not only reduces the radiant energy absorbed by elements within lens system 130 by about half, but it reduces the energy absorbed by the polarizers 244 and 245 by more than half, since they transmit most of the energy having an aligned polarization. In certain embodiments, the use of polarizers 224 and 225 can reduce the radiant energy absorbed by polarizers 244 and 245 by greater than 70%. As a result, polarizers 244 and 245 experience much less heating from the projecting light compared to prior art systems, even as the brightness of the illuminator (not shown) increases.

Vertically polarized light 228 and 229 from the polarizer assembly 220 enter the upper and lower lens halves of lens system 130, respectively, and exit from the respective exit lens elements 238 and 239. For reasons previously discussed in connection with FIG. 1, light beams 228 and 229 exiting from lens system 130 may have a small fraction of horizontally polarized component. Polarizers 244 and 245, which are configured to transmit vertically polarized light, act as cleanup polarizers, resulting in light beams 228 and 229 being substantially (e.g., almost 100%) vertically polarized. These vertically polarized beams are then transformed by the respective quarter-wave retarders 248 and 249 into circularly polarized beams 258 and 259 for projecting right- and left-eye images onto screen 150.

In other embodiments, the linear polarizer 244 and/or polarizer 245 in FIG. 2A can be omitted (similar to the previous discussion of FIG. 1), if desired, as long as polarizers 224 and 225 are able to provide substantially linearly polarized light in the respective polarizations to produce the required circularly polarized light for stereoscopic projection. Special care is needed to achieve proper alignment between polarizers 224, 225 and the respective quarter-wave retarders 248, 249. However, such a configuration (with omitted polarizer 244/245) may result in reduced performance, e.g., increased crosstalk near the corners or edges of the projected images.

As light beams 258 and 259 are reflected by polarization-preserving screen 150, the direction of circular polarization is reversed. Thus, a right-eye image projected onto screen 150 with counter-clockwise circularly (CCW) polarized light 258 becomes clockwise (CW) circularly polarized upon reflection from screen 150. Conversely, a left-eye image projected with light 259 is incident on screen 150 as CW circularly polarized light, but is reflected from screen 150 as CCW polarized light.

To view the projected images in 3D, audience member 260 is provided with 3D glasses such that the right eye 270 is covered by the right-eye portion 271 of the 3D glasses, which includes a linear polarizer 272 having axis of polarization 272P and a quarter-wave retarder 274 having fast axis orientation 274F to form a clockwise, or right-handed circular polarizer. Left eye 280 of audience member 260 is covered by the left-eye portion 281 of the 3D glasses, which includes a linear polarizer 282 having axis of polarization 282P and a quarter-wave retarder 284 having fast axis 284F to form a counter-clockwise or left-handed circular polarizer. The CW circular polarizer (can also be referred to as a viewing polarizing filter) of the right-eye portion 271 of the 3D glasses allows viewing of right-eye images, but not the CCW circularly polarized left-eye images. Similarly, left-eye images can be viewed by the left eye 280 through the CCW circular polarizer of left-eye portion 281, but not the CW right-eye images.

Each of the viewing polarizing filters (combination of quarter-wave retarder and linear polarizer) in the 3D glasses effectively serves as an analyzer of the projected right- or left-eye images. For example, circularly polarized light from a projected right-eye image enters the right-eye viewing filter through the quarter-wave retarder 274 and exits the linear polarizer 272. If the viewing polarizing filter is properly configured with respect to the encoding filter, then most of the light for the right-eye image will be transmitted.

With proper configurations for the encoding polarizing filters and viewing polarizing filters, stereoscopic image pairs such as R2 and L2 can be viewed with desired 3D effects. The use of circular polarization for projecting and viewing the images overcomes the problem of crosstalk sensitivity encountered in a projection system based on linear polarization, such that a change in the orientation of 3D glasses worn by audience member 260 (such as tilting the head) will not induce noticeable crosstalk effects between the right- and left-eye images.

System performance and desired 3D viewing results are affected by the orientations of various components in the encoding and viewing circular polarizers. The consideration of system configurations is discussed below.

In the system of FIG. 2A, circularly polarized light is formed in the projection system by directing light into linear polarizers 224, 225, 244, 245 and quarter-wave retarders 248, 249. The relative orientation of the viewing polarizing filters with respect to the encoding polarizing filters can be adjusted or selected to provide different 3D results, e.g., optimal or desired results. In this context, the relative orientation between the viewing and encoding polarizing filters refers to a relative rotation of the viewing circular polarizer, i.e., (272, 274) as a unit, with respect to the encoding circular polarizer in the projector. For example, the right-eye viewing polarizer can be rotated to an orientation providing maximum transmission of CW circularly polarized light, which is optimum for transmitting right-eye images. If it is rotated to other orientations, however, the transmission of CW polarized light may be reduced. The amount of light passed or blocked by a set of circular polarizers (i.e., an encoder, e.g., 241 or 242; and an analyzer, e.g., 271 or 281) is affected only slightly by the rotation of either circular polarizer. Some sets of circular polarizers selected to transmit light (e.g., 241 and 271) will provide a transmission of between 70 and 90%, depending on the circular polarizers' relative rotations. Similarly, some sets of circular polarizers selected to block (e.g. 241 and 281), might provide an extinction ratio of between about 20:1 to 50:1, again depending on the circular polarizers' relative rotations.

This being the case, it is a common misconception that the extinction provided is relatively insensitive to the rotation of the viewing circular polarizers, and so, once the direction (e.g., clockwise for right-eye, counter-clockwise for left-eye) of the circular polarization has been established, one may cavalierly or arbitrarily select the orientation of the linear polarizers (e.g., 224/244 and 225/245) in the encoding circular polarizers, and independently select the orientations of the linear polarizers (e.g., 272 and 282) in the 3D glasses. However, such a arbitrary selection will likely not provide an optimum 3D viewing result, because there is a certain configuration, i.e., relative orientations between the linear polarizers in the projector and the viewing glasses, that would produce optimal or better performance results, as explained below.

Actual quarter-wave retarders exhibit non-ideal behavior due to wavelength variations, that is, they retard a particular wavelength of light by exactly 90°, but other wavelengths are retarded by slightly more or slightly less than 90°. As a result, a discoloration may occur in transmission, which is most prominent when the fast axes of the first circular polarizer at the projector and the second circular polarizer (the analyzer) at the glasses are aligned in the same direction. In this case, the alignment of the fast axes induces an aggregate retardation of $\lambda/2$, or 180°, and whatever non-ideal deviation the quarter-wave retarder exhibits is doubled. For example, if the retarder is a perfect 90° quarter-wave retarder for a particular wavelength of green light, but an 89° retarder for a particular wavelength of red light and a 92° retarder in the blue, then this doubling will retard the red light by 178° and the blue by 184°. As a result, at the linear polarizer of the 3D viewing glasses, the red light is attenuated more than the green light, and the blue light by an even larger amount. This is because upon exiting the retarder in the analyzer, the wavelengths of light retarded to exactly 180° are once again linearly polarized, and in transmission mode, are in parallel with the polarization axis of the linear polarizer, and so are transmitted with minimum attenuation (in extinction mode, the polarization of the light exiting the retarder is perpendicular to the axis of the linear polarization, and extinction is maximized). However, those wavelengths retarded by a little more or a little less than 180° have a component proportional to the absolute value of the cosine of the retardation angle that will pass, but a component proportional to the absolute value of the sine of the retardation angle that will be blocked. Thus, in this example, both red and blue wavelengths though largely transmitted, will exhibit slightly greater attenuation than the green wavelengths. (In extinction mode, the would be a somewhat greater leakage of the red and blue wavelengths, resulting in slightly lower extinction). In this configuration, the filter may appear to imbue the image as perceived by the audience member with a yellow/greenish cast. In extinction, these same retarders will produce a slight magenta cast, representing worse leakage of the red and blue than of the green portion of the spectrum.

However, this discoloration can be minimized or nearly eliminated by orienting the fast axis of one quarter-wave retarder (e.g., of the circular polarizer in the projector) with the slow axis of the other quarter-wave retarder (e.g., of the circular polarizer in the 3D glasses), which is the same as orienting the fast axis of one quarter-wave retarder to be orthogonal to the fast axis of the other quarter-wave retarder. With this configuration, polarized light at any given wavelength is subjected to a certain retardation through a fast axis and an opposite retardation through a slow axis, resulting in a net cancellation of retardation (i.e., 0°) at all wavelengths. By doing this, after passing through two of the quarter-wave retarders (e.g., either one at the projector and then a corresponding one for the same stereoscopic image at the 3D glasses), a given polarization is assured of receiving the same retardation (i.e., 0°), regardless of wavelength, at which point the analyzing polarizer at the 3D glasses is able to perform at its optimal to transmit or extinguish the projected image.

Such a configuration (with the fast axis of the quarter-wave retarder in the encoding polarizer being aligned with the fast axis of the quarter-wave retarder in viewing polarizer) is illustrated in FIG. 2A, e.g., fast axes 248F and 249F being aligned orthogonally to fast axes 284F and 274F, respectively. Noting that this pair corresponds to the right-eye projection filter 241 having a fast axis (248F of quarter-wave retarder 248) being orthogonal to the fast axis (284F of the quarter-wave retarder 284) in the left-eye filter 281 of 3D glasses, which means that this pair is configured for maximum extinction, so that left eye 280 sees little or none of the projection of right-eye image 102. However, the fast axis (248F) of right-eye projection filter 241 is not orthogonal to the fast axis (274F) of right-eye glasses filter 271. Thus, right-eye 270 is able to see the projection of right-eye image 102, but it will be imbued with a slight discoloration.

As shown in FIG. 2A, linear polarizers 244, 245 in the respective encoding filters have a common polarization orientation, i.e., polarization axes 244P, 245P of these linear polarizers are aligned in the same direction, or parallel to each other. Similarly, linear polarizers 272, 282 in the right- and left-eye portions 271, 281 of 3D viewing glasses also have a common orientation, i.e., their respective polarization axes 272P and 282P are in the same direction.

Furthermore, the polarization axes 244P, 245P of linear polarizers 244, 245 in the projector are orthogonal to the polarization axes 272P, 282P of linear polarizers 272, 282 in the 3D glasses. This combination of linear polarization orientations for the encoding and viewing filters constrains the fast axes 250, 251, 275, 285 of all the quarter-wave retarders in the circular polarizers to be oriented as shown in FIG. 2A.

The resulting system configuration (i.e., the specific orientations of all components in the encoding and viewing polarizers) provides the optimal extinction characteristics for all wavelengths because blocked polarizations will have undergone a net 0° retardation across all wavelengths. However, this configuration also provides a non-optimal transmission characteristics because transmitted polarizations will have undergone the wavelength-dependent double retardation resulting in about a net retardation near 180° near the center of the spectrum with increasing deviations toward the ends of the spectrum.

This configuration has a minimized crosstalk due to optimized extinction across the spectrum. There are techniques that can be used to at least partially mitigate the perception of any remaining crosstalk. One example of such a technique is discussed in U.S. patent application Ser. No. 12/846,676, "Method and System for Crosstalk Correction for 3D Projection" by Redmann et al.

The system configuration of FIG. 2A is also compatible with a configuration commonly used in many digital 3D projection systems. This commonly used system has a single-lens stereoscopic digital cinema projector, such as the DP2000 by Barco N.V. of Belgium (or other digital cinema projector) equipped with one of a dynamic polarizing filter such as the RealD Cinema System (previously marketed as a ³Z-Screen²) by RealD of Beverly Hills, Calif.". Although there are other configurations that can produce better performance results, the adoption of the configuration in FIG. 2A has an advantage that it is compatible with the dominant type of viewing 3D glasses that are commercially available and in widespread use.

Other possible system configurations can be assessed by considering the effect of the relative orientations of the encoding and viewing polarizers on the performance characteristics. For example, if one uses an extinction ratio (e.g., transmission of desired polarization versus undesired polarization) and discoloration of the transmitted light as performance criteria, one may conclude that an optimal technical choice is to align the two quarter-wave retarders in the encoding circular polarizers to share a common orientation. Such a configuration would also require that the two linear polarizers in the encoding polarizers be orthogonally oriented. This combination of component orientations in the encoding polarizers will also require corresponding orientation changes to the viewing filter orientations in the 3D glasses, i.e., different from that shown in FIG. 2A.

Figure 2B:
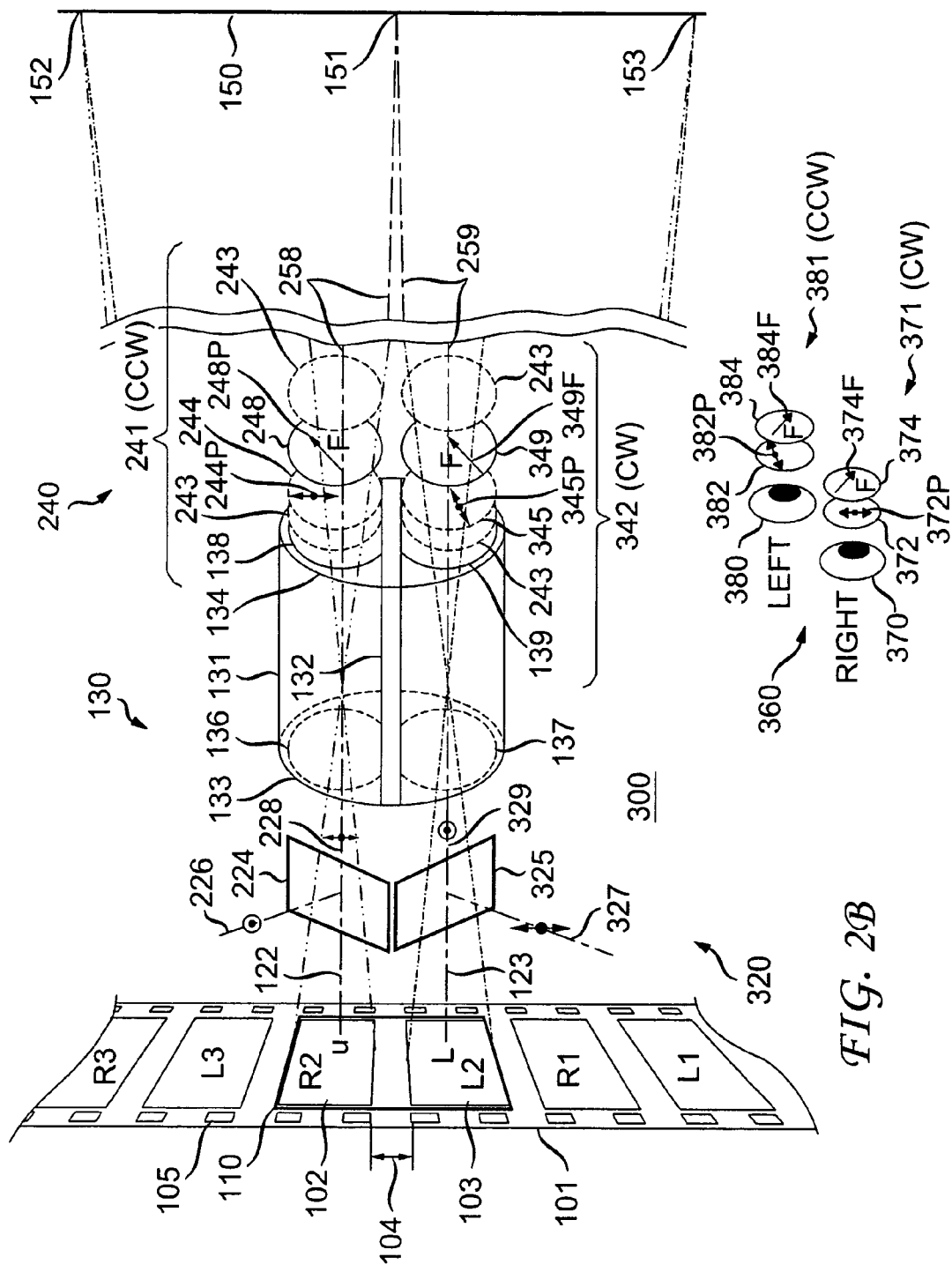
FIG. 2B shows a stereoscopic film projection system using a dual lens and polarizer assembly according to another embodiment of the present invention.

FIG. 2B illustrates a projection system 300 with a configuration different from that of system 200. System 300 has a linear polarizer assembly 320 with linear polarizers 224 and 325 with properties and functions that are the same as the corresponding polarizers in system 200. The encoding polarizer assembly 340 has an encoding polarizer sub-assembly 342 for encoding left-eye images, and polarizer sub-assembly 241 for encoding right-eye images.

Unlike the configuration in FIG. 2A, the linear polarizer 325 is oriented to transmit horizontally polarized light 329, and the linear polarizer 345 is also oriented to transmit horizontally polarized light exiting from the lens system 300. In order to produce clockwise circularly polarized light for encoding left-eye images, the quarter-wave retarder 349 is oriented such that its fast axis 349F is rotated at 45° clockwise from the polarization axis 345P of the linear polarizer 345 (as seen through or from polarizer 345). The orientations for polarizer 224 and components in sub-assembly 241 are the same as those shown in FIG. 2A.

In the encoding circular polarizers, linear polarizers 244 and 345 are oriented to transmit orthogonal polarizations, while the quarter-wave retarders 248 and 349 are oriented to have common orientation for their respective fast axes 248F and 349F.

With this particular configuration of the encoding polarizers, the viewing filters in the left- and right-portions 381, 371 of the 3D glasses for audience member 360 will have orientations different from those in FIG. 2A. Left-eye viewing filter 381 includes a quarter-wave retarder 384 with fast axis 384F and a linear polarizer 382 with polarization axis 382P, and right-eye viewing filter 371 includes quarter-wave retarder 374 with fast axis 374F and a linear polarizer 372 with polarization axis 372P. Fast axes 374F and 384F are oriented in the same direction, while polarization axis 382P for the left-eye filter is oriented in a horizontal direction and polarization axis 372P for the right-eye filter is oriented in a vertical direction.

The configuration in FIG. 2B provides improved transmission results (i.e., minimal discoloration) compared to that of system 200, though crosstalk is expected to be similar to that of system 200.

Although the above examples are discussed with reference to a film-based dual-lens projection system, it is understood that one or more features of the present invention can be adapted to other 3D projection systems, including systems with two synchronized projectors for projecting left- and right-eye images or digital cinema projectors. In addition, various features discussed above can be used singly or in combination, as appropriate for different applications.

While the forgoing is directed to various embodiments of the present invention, other embodiments of the invention may be devised without departing from the basic scope thereof. Thus, the appropriate scope of the invention is to be determined according to the claims that follow.

What is claimed is:

1. A system for three-dimensional (3D) projection of right-eye images and left-eye images, comprising:
   a first linear polarizer before at least a first lens element for transmitting the right-eye images, the first linear polarizer having a first polarization axis direction;
   a second linear polarizer before at least a second lens element for transmitting the left-eye images, the second linear polarizer having a second polarization axis direction;
   wherein the first and second linear polarizers are configured for limiting luminant flux reaching at least the first and second lens elements.

2. The system of claim 1, wherein the first and second linear polarizers are reflective polarizers.

3. The system of claim 1, wherein the luminant flux reaching each of the first and second lens elements is about one half of an amount of luminant flux incident on the respective first and second linear polarizers.

4. The system of claim 1, further comprising:
   a first output filter assembly after the first lens element, the first output filter assembly having at least one of: a third linear polarizer and a first quarter wave retarder; and
   a second output filter assembly after the second lens element, the second output filter assembly having at least one of: a fourth linear polarizer and a second quarter wave retarder.

5. The system of claim 4, wherein the third linear polarizer has a third polarization axis direction that is substantially parallel to the first polarization axis direction; and the fourth linear polarizer has a fourth polarization axis direction that is substantially parallel to the second polarization axis direction.

6. The system of claim 4, wherein the third and fourth linear polarizers are absorptive polarizers.

7. The system of claim 4, wherein first and second linear polarizers are provided in one of two configurations: the first polarization axis direction being orthogonal to, or parallel to, the second polarization axis direction.

8. The system of claim 1, wherein the first polarization axis direction is orthogonal to the second polarization axis direction.

9. The system of claim 1, further comprising:
   a first quarter-wave retarder after at least the first lens element; and
   a second quarter-wave retarder after at least the second lens element.

10. The system of claim 4, further comprises:
    the first quarter-wave retarder having a first fast axis oriented to one of: 45 degrees clockwise or 45 degrees counterclockwise, relative to the first polarization axis direction; and
    the second quarter-wave retarder having a second fast axis being oriented to the other one of: 45 degrees clockwise or 45 degrees counterclockwise, relative to the second polarization axis direction.

11. The system of claim 1, configured for projecting right-eye images using one of: linearly polarized light or circularly polarized light.

12. The system of claim 1, configured for projecting right-eye images and left-eye images using linearly polarized light, with the first polarization axis direction orthogonal to the second polarization axis direction.

13. The system of claim 1, configured for projecting the right-eye images using a first one of clockwise or counter-clockwise circularly polarized light, and for projecting the left-eye images using the other one of clockwise or counter-clockwise circular polarized light.

14. A method for three-dimensional (3D) projection of right-eye and left-eye images, comprising:
    transmitting the right-eye images through a first linear polarizer and at least a first lens element positioned after the first linear polarizer;
    transmitting the left-eye images through a second linear polarizer and at least a second lens positioned after the second linear polarizer;
    wherein the first and second linear polarizers are configured for transmitting light characterized by respective first and second polarization axis directions, and for limiting luminant flux reaching the first and second lens elements.

15. The method of claim 14, wherein the first and second linear polarizers are reflective polarizers.

16. The method of claim 14, further comprising:
    limiting the luminant flux reaching each of the first and second lens elements to about one half of an amount of luminant flux incident on the respective first and second linear polarizers.

17. The method of claim 14, further comprising:
    transmitting the right-eye images through a first output filter assembly after the first lens element, the first output filter assembly having at least one of: a third linear polarizer and a first quarter wave retarder; and
    transmitting the left-eye images through a second output filter assembly after the second lens element, the second output filter assembly having at least one of: a fourth linear polarizer and a second quarter wave retarder.

18. The method of claim 17, further comprising:
    orienting the third linear polarizer for transmitting light substantially characterized by the first polarization axis direction;
    orienting the fourth linear polarizer for transmitting light substantially characterized by the second polarization axis direction.

19. The method of claim 17, wherein the third and fourth linear polarizers are absorptive polarizers.

20. The method of claim 17, further comprising:
    orienting the first and second polarizers in one of two configurations: with the first polarization axis direction being orthogonal to, or parallel to, the second polarization axis direction.

21. The apparatus of claim 14, further comprising:
    providing the first polarization axis direction to be orthogonal to the second polarization axis direction.

22. The method of claim 14, further comprising:
    transmitting the right-eye images through a first quarter-wave retarder after at least the first lens element; and
    transmitting the left-eye images through a second quarter-wave retarder after at least the second lens element.

23. The method of claim 17, further comprises:
    orienting a first fast axis of the first quarter-wave retarder to a first one of: 45 degrees clockwise or 45 degrees counterclockwise, relative to the first polarization axis direction; and
    orienting a second fast axis of the second quarter-wave retarder to a second one of: 45 degrees clockwise or 45 degrees counterclockwise, relative to the second polarization axis direction.

24. The method of claim 14, further comprising:
    projecting right-eye images using one of: linearly polarized light or circularly polarized light.

25. The method of claim 14, further comprising:
projecting right-eye images and left-eye images using linearly polarized light, with the first polarization axis direction orthogonal to the second polarization axis direction.

26. The method of claim 14, further comprising:
projecting the right-eye images using a first one of clockwise or counterclockwise circularly polarized light, and for projecting the left-eye images using a second one of clockwise or counterclockwise circular polarized.

* * * * *